(12) United States Patent
Yoon

(10) Patent No.: US 10,065,584 B2
(45) Date of Patent: Sep. 4, 2018

(54) GENERATION VOLTAGE DETERMINATION APPARATUS AND GENERATION VOLTAGE CONTROL SYSTEM

(71) Applicant: Toyota Jidosha Kabushiki Kaisha, Toyota-shi Aichi-ken (JP)

(72) Inventor: Taejin Yoon, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 141 days.

(21) Appl. No.: 15/219,911

(22) Filed: Jul. 26, 2016

(65) Prior Publication Data

US 2017/0033592 A1 Feb. 2, 2017

(30) Foreign Application Priority Data

Jul. 30, 2015 (JP) .................................. 2015-151090

(51) Int. Cl.
*B60R 16/033* (2006.01)
*H02J 7/14* (2006.01)
*B60R 16/03* (2006.01)

(52) U.S. Cl.
CPC ............ *B60R 16/03* (2013.01); *B60R 16/033* (2013.01); *H02J 7/1438* (2013.01); *H02J 7/1446* (2013.01); *Y02T 10/92* (2013.01)

(58) Field of Classification Search
CPC ...... B60R 16/03; B60R 16/033; H02J 7/1438; H02J 7/1446; Y02T 10/92
USPC ........................................................ 307/10.1
See application file for complete search history.

(56) References Cited

U.S. PATENT DOCUMENTS

| 5,875,864 A | * | 3/1999 | Yano | ...................... B60K 6/485 |
| | | | | 123/198 DB |
| 2006/0097577 A1 | * | 5/2006 | Kato | ................... F02N 11/0866 |
| | | | | 307/10.1 |
| 2007/0213921 A1 | * | 9/2007 | Yamaguchi | ........... B60W 10/06 |
| | | | | 701/115 |
| 2008/0093851 A1 | * | 4/2008 | Maeda | ................... H01M 10/48 |
| | | | | 290/40 A |
| 2009/0033290 A1 | * | 2/2009 | Tomura | ................. B60R 16/033 |
| | | | | 320/149 |
| 2010/0286857 A1 | | 11/2010 | Otake | |
| 2011/0215764 A1 | | 9/2011 | Takahashi et al. | |

(Continued)

FOREIGN PATENT DOCUMENTS

| JP | S62053135 A | 3/1987 |
| JP | 2001-016800 | 1/2001 |
| JP | 2009-165230 A | 7/2009 |

(Continued)

*Primary Examiner* — Levi Gannon
(74) *Attorney, Agent, or Firm* — Dinsmore & Shohl LLP

(57) ABSTRACT

An electric load medium works at a generation voltage of a generator while at least one processor is controlling the generation voltage of the generator considering a traveling state of a vehicle. The generation voltage of the generator is controlled considering the traveling state of the vehicle, when a first condition that a value that indicates a state of charge of a battery of the vehicle that is charged by power generated by the generator is less than or equal to the predetermined threshold is satisfied, and a second condition that the vehicle is during deceleration is satisfied. Otherwise, the generation voltage of the generator is controlled considering working of the electric load medium.

2 Claims, 10 Drawing Sheets

(56) References Cited

U.S. PATENT DOCUMENTS

2013/0140883 A1\* 6/2013 Tawada ................... B60R 16/03
307/9.1
2015/0280630 A1 10/2015 Yoon

FOREIGN PATENT DOCUMENTS

| | | |
|---|---|---|
| JP | 2011-188597 A | 9/2011 |
| JP | 2014-011826 A | 1/2014 |
| JP | 2015171263 A | 9/2015 |
| WO | 2014/083596 A1 | 6/2014 |

\* cited by examiner

US 10,065,584 B2

GENERATION VOLTAGE DETERMINATION APPARATUS AND GENERATION VOLTAGE CONTROL SYSTEM

CROSS-REFERENCE TO RELATED APPLICATIONS

The present application is based on and claims the benefit of priority of Japanese Priority Application No. 2015-151090, filed on Jul. 30, 2015, the entire contents of which are hereby incorporated herein by reference.

BACKGROUND

1. Technical Field

The present disclosure relates to a generation voltage determination apparatus and a generation voltage control system that includes the same.

2. Description of the Related Art

A generation voltage instruction apparatus is known which determines a generation voltage of a generator included in a vehicle, and controls the generation voltage considering the vehicle's traveling state. For example, during deceleration of the vehicle, in order to avoid degradation in drivability, the generation voltage is determined to control deceleration of the vehicle through regenerative braking to be less than or equal to a predetermined threshold.

Further, if a predetermined electric load medium that consumes power generated by the generator works, the generation voltage instruction apparatus stops determining the generation voltage considering the vehicle's traveling state, and determines a predetermined generation voltage necessary for working of the electric load medium. By thus giving priority to working of the electric load medium, it is possible to avoid a fluctuation in the light quantities, if the electric load medium includes lighting such as the vehicle's headlamps, interior lamps, and so forth, for example. If the electric load medium includes driving devices such as a wiper motor, a blower motor, and so forth, it is also possible to avoid a fluctuation in their driving speeds.

International publication No. 2014/083596 discloses related technology.

SUMMARY

According to one aspect, a generation voltage control apparatus, includes at least one processor configured to, if an electric load medium works at a generation voltage of a generator while the at least one processor is controlling the generation voltage of the generator considering a traveling state of a vehicle, (i) control the generation voltage of the generator considering the traveling state of the vehicle, when a first condition that a value that indicates a state of charge of a battery of the vehicle that is charged by power generated by the generator is less than or equal to the predetermined threshold is satisfied, and a second condition that the vehicle is during deceleration is satisfied too, (ii) control the generation voltage of the generator considering working of the electric load medium, when the first condition is not satisfied whereas the second condition is satisfied, (iii) control the generation voltage of the generator considering working of the electric load medium, when the second condition is not satisfied whereas the first condition is satisfied and (iv) control the generation voltage of the generator considering working of the electric load medium, when the first condition is not satisfied, and the second condition is not satisfied either.

Other objects, features and advantages will become more apparent from the following detailed description when read in conjunction with the accompanying drawings.

DETAILED DESCRIPTION OF EMBODIMENTS

Figure 1:
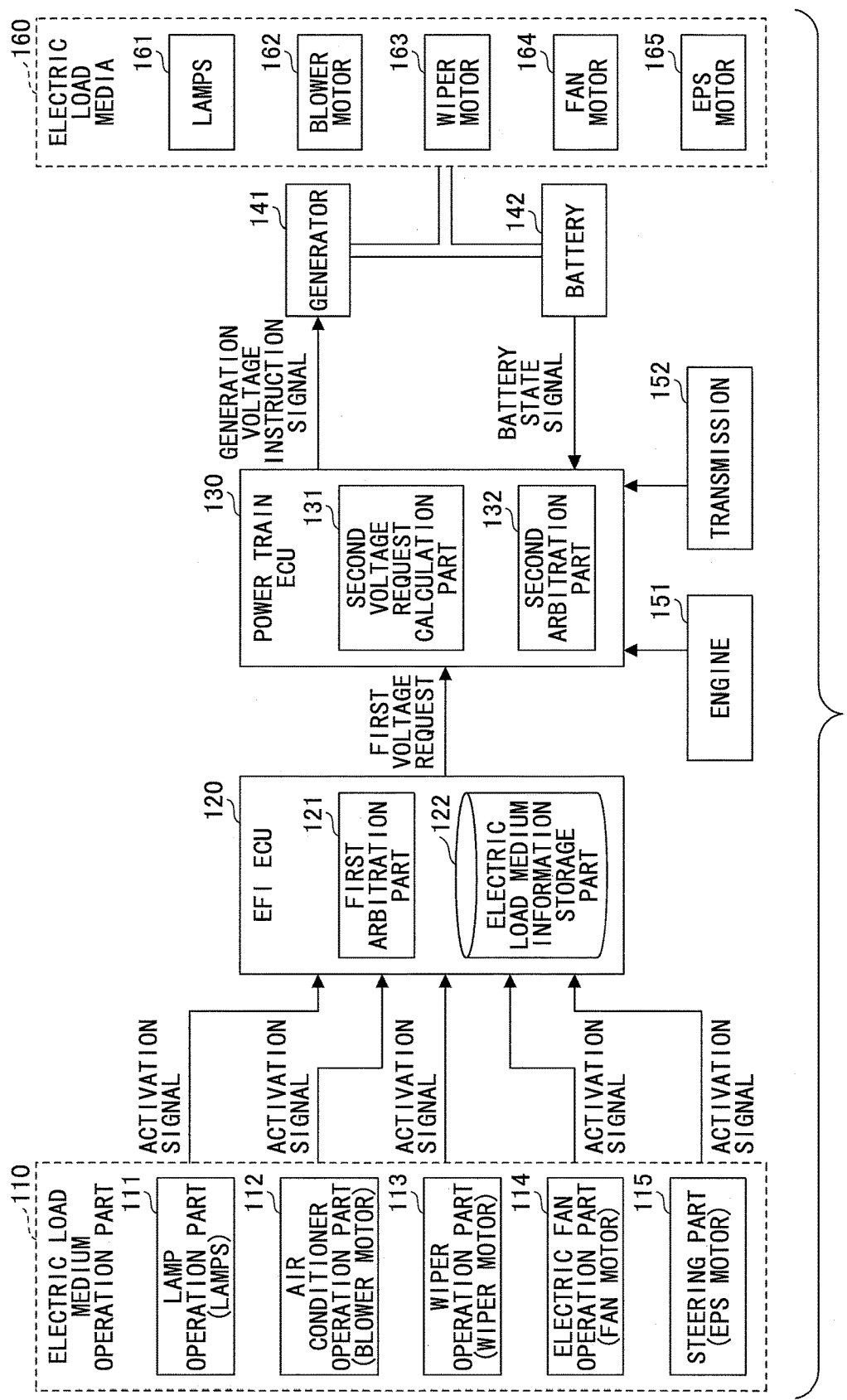
FIG. 1 illustrates one example of an overall configuration of a generation voltage control system.

For the purpose of convenience, the description of the above-mentioned related art will now be continued first.

In some cases, even if the predetermined electric load medium is working, the generation voltage should be determined considering the vehicle's traveling state. For example, if priority is given to working of the electric load medium even in the vehicle's deceleration state, the deceleration effect due to regenerative braking may exceed a predetermined threshold, and the drivability may be remarkably degraded, depending on the battery state of charge.

Embodiments of the present disclosure have an object to determine a generation voltage of a generator when a predetermined electric load medium is working in such a manner as to avoid remarkable degradation in the drivability which may otherwise occur in a state of deceleration of the vehicle.

The embodiments of the present disclosure will now be described with reference to the drawings. In the descriptions and the drawings, the same reference numerals are given to elements that have substantially the same configurations, and duplicate description will be omitted.

First Embodiment

1. Overall Configuration of Generation Voltage Control System

First, an overall configuration of a generation voltage control system will be described that includes a power train ECU (Electronic Control Unit), which is one example of a generation voltage instruction apparatus according to a first embodiment. FIG. 1 illustrates one example of an overall configuration of the generation voltage control system included in a vehicle. As shown in FIG. 1, the generation voltage control system 100 includes an electric load medium operation part 110, an EFI (Electric Fuel Injection) ECU 120, the power train ECU 130, a generator 141, and a battery 142. The generation voltage control system 100 further includes an engine 151, a transmission 152, and electric load media 160.

The electric load medium operation part 110 includes a lamp operation part 111, an air conditioner operation part 112, a wiper operation part 113, an electric fan operation part 114, and a steering part 115. The electric load medium operation part 110 outputs instructions to cause the electric load media 160 to work by applying voltages from the generator 141 (or the battery 142).

The lamp operation part 111 turns on lamps (i.e., headlamps, interior lamps, and so forth) 161 included in the vehicle. The air conditioner operation part 112 turns on a blower motor 162 that drives the blower included in an air conditioner of the vehicle.

The wiper operation part 113 turns on a wiper motor 163 that drives the wiper of the vehicle. The electric fan operation part 114 turns on a fan motor 164 that drives an electric fan of the vehicle.

The steering part 115 turns on an EPS (Electric Power Steering) motor 165 installed in the vehicle in response to a driver of the vehicle operating the steering part 115.

As a result of the respective operation parts included in the electric load medium operation part 110 being operated, the electric load medium operation part 110 transmits corresponding activation signals to the EFI ECU 120.

The EFI ECU 120 is a control unit that controls an electronically controlled fuel injection system, and has a first arbitration program installed therein. As a result of the EFI ECU 120 executing the first arbitration program, the EFI ECU 120 functions as a first arbitration part 121.

The first arbitration part 121 carries out a first arbitration process. Actually, the first arbitration part 121 identifies electric load media (i.e., any of the electric load media 160) that work with power supplied by the generator 141, based on the activation signals received from the electric load medium operation part 110. The first arbitration part 121 reads electric load medium information 300 from an electric load medium information storage part 122, and acquires respective acceptable voltage ranges for the identified electric load media, i.e., acceptable voltage ranges to be applied by the generator 141. The first arbitration part 121 also acquires acceptable rates of voltage change, i.e., acceptable rates of voltage change at which the generator 141 changes the generation voltage.

The first arbitration part 121 calculates an overlapping range where the respective acceptable voltage ranges of the identified electric load media overlap, and also, selects the lowest one of the respective acceptable rates of voltage changes of the identified electric load media.

The first arbitration part 121 transmits a first voltage request to request a generation voltage (i.e., the calculated overlapping voltage range and the selected lowest rate of voltage change) to the power train ECU 130.

The power train ECU 130 controls a power train that transmits the power generated by the engine 151 to the wheels via the transmission 152, and so forth, and has a second voltage request calculation program and a second arbitration program installed therein. As a result of the power train ECU 130 executing the second voltage request calculation program and the second arbitration program, the power train ECU 130 functions as a second voltage request calculation part 131 and a second arbitration part 132.

The second voltage request calculation part 131 derives a voltage range and a rate of voltage change acceptable when the generation voltage of the generator 141 is changed to the voltage range, based on the vehicle's traveling state, a value that indicates the state of charge of the battery 142, and so forth. The vehicle's traveling state includes, for example, the traveling state acquired based on various controlled states and operated states concerning traveling of the vehicle such as the controlled state of the engine 151, the controlled state of the transmission 152, the depressed state of the brake pedal, and so forth.

Hereinafter, the derived voltage range and rate of voltage change for controlling the deceleration effect caused by regenerative braking during deceleration of the vehicle within a predetermined value from the viewpoint of the drivability will be referred to as a "voltage range and rate of voltage change considering the vehicle's drivability". Because the drivability during deceleration of the vehicle will be described, hereinafter the "vehicle's traveling state" denotes a state where the vehicle is traveling at a constant speed, a state where the vehicle is accelerating, or a state where the vehicle is decelerating. The deceleration effect caused by regenerative braking during deceleration of the vehicle denotes, for example, the acceleration in the reverse direction during deceleration of the vehicle.

The second voltage request calculation part 131 sends a second voltage request for requesting the generation voltage (i.e., the voltage range and the rate of voltage change) to the second arbitration part 132.

The second arbitration part 132 carries out a second arbitration process. Actually, the second arbitration part 132 acquires the first voltage request transmitted by the EFI ECU 120 and the second voltage request sent from the second voltage request calculation part 131, and selects between these voltage requests. Then, the second arbitration part 132 generates a generation voltage instruction signal, and transmits it to the generator 141. The second arbitration process for a case where the first voltage request signal is sent from the EFI ECU 120 while the power train ECU 130 is transmitting the generation voltage instruction signal to the generator 141 based on the second voltage request sent from the second voltage request calculation part 131 will be described later in detail.

The generator 141 receives the generation voltage instruction signal transmitted from the power train ECU 130, and carries out generation based on the received generation voltage instruction signal. Then the power thus generated by the generator 141 is supplied to the electric load media 160 which then work therewith. Also, the power generated by the generator 141 is supplied to the battery 142 and the battery 142 is charged therewith.

The battery 142 is thus changed by the power generated by the generator 141, and supplies the charged power to the electric load media 160. The battery 142 has a battery sensor installed therein for detecting its state of charge. The state of charge thus detected is transmitted to the power train ECU 130 as a battery state signal. Thus, the power train ECU 130 acquires the value that indicates the state of charge of the battery 142.

The electric load media 160 work with the power supplied by the generator 141 (or the battery 142). The electric load media 160 include the lamps 161, the blower motor 162, the wiper motor 163, the fan motor 164, and the EPS motor 165, and are influenced by a change in the generation voltage of the generator 141. The electric load media 160 work based on operations performed by the vehicle occupants on the electric load medium operation part 110.

In the example of FIG. 1, the first arbitration part 121 is implemented by the EFI ECU 120, and the second voltage request calculation part 131 and the second arbitration part 132 are implemented by the power train ECU 130. However, embodiments of the present disclosure are not limited thereto. For example, the first arbitration part 121, the second voltage request calculation part 131, and the second arbitration part 132 can be implemented by the same ECU (i.e., any function can be implemented by any ECU).

2. Hardware Configuration of EFI ECU and Power Train ECU

Figure 2:
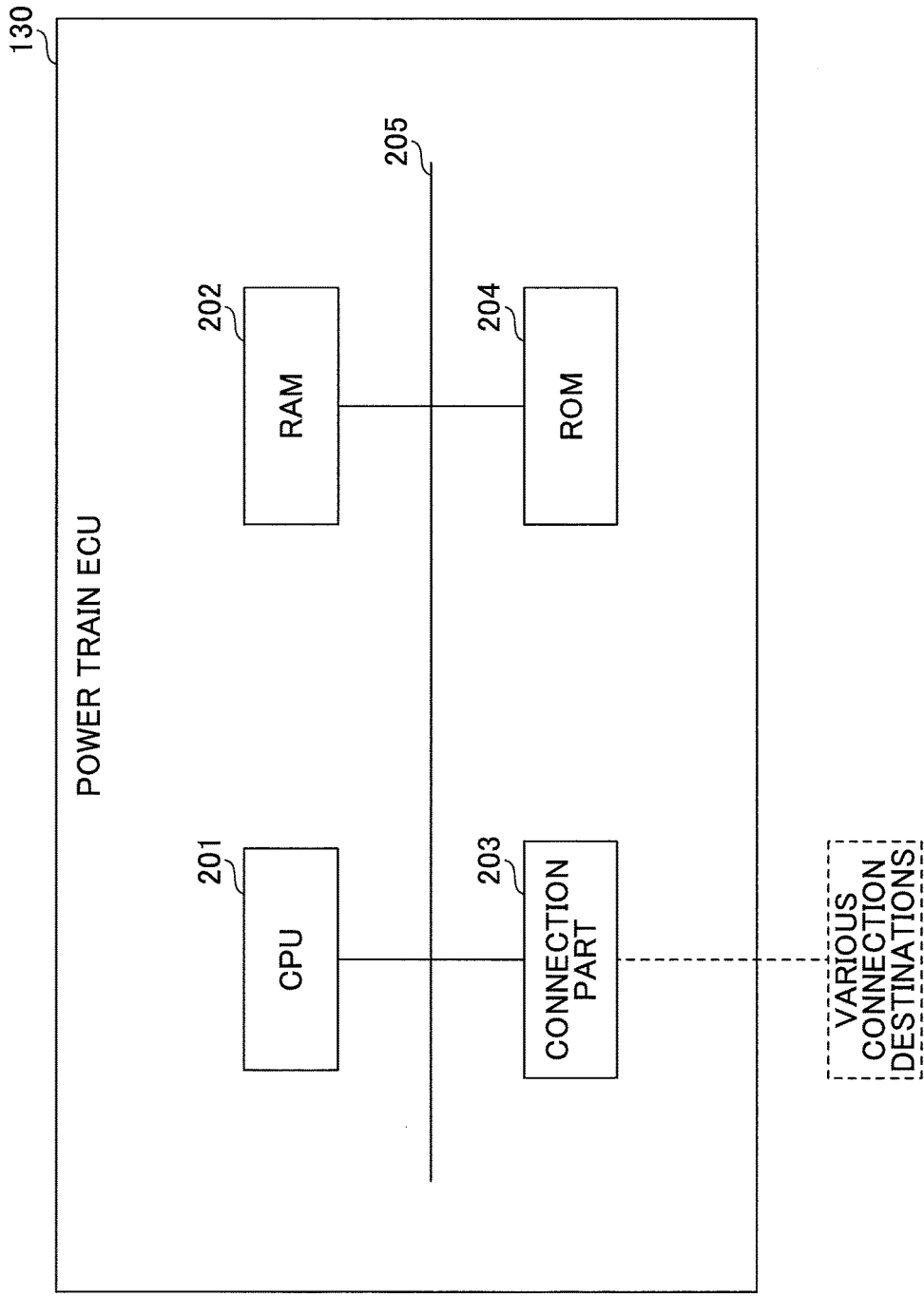
FIG. 2 illustrates one example of a hardware configuration of a power train ECU.

Next, hardware configurations of the EFI ECU 120 and the power train ECU 130 will be described. The hardware configurations of the EFI ECU 120 and the power train ECU 130 are almost the same. Therefore, here, the hardware configuration of the power train ECU 130 will be described. FIG. 2 illustrates one example of a hardware configuration of the power train ECU 130.

As shown in FIG. 2, the power train ECU 130 includes a CPU (Central Processing Unit) 201, a RAM (Random Access Memory) 202, a connection part 203, and a ROM (Read-Only Memory) 204. These parts of the power train ECU 130 are mutually connected via a bus 205.

The CPU 201 executes various programs stored in the ROM 204 (for example, the second voltage request calculation program, the second arbitration program, and so forth).

The RAM 202 is a main storage such as a DRAM (Dynamic Random Access Memory), an SRAM (Static Random Access Memory), or the like. The RAM 202 is used as a working area for storing the various programs stored in the ROM 204 while the programs are being executed by the CPU 201. The RAM 202 is used also as a storage area for temporarily storing information acquired as a result of the various programs stored in the ROM 204 being executed by the CPU 201 (for example, the first voltage request, the second voltage request, and so forth).

The connection part 203 is connected with various connection destinations such as the EFI ECU 120, the generator 141, the battery 142, the engine 151, and the transmission 152, and acts as an interface for transmitting and receiving various sorts of information among these connection destinations.

The ROM 204 is a main storage such as an EPROM, an EEPROM, or the like, and stores the various programs to be executed by the CPU 201 and information used when the CPU 201 executes the various programs.

3. Electric Load Medium Information

Figure 3:
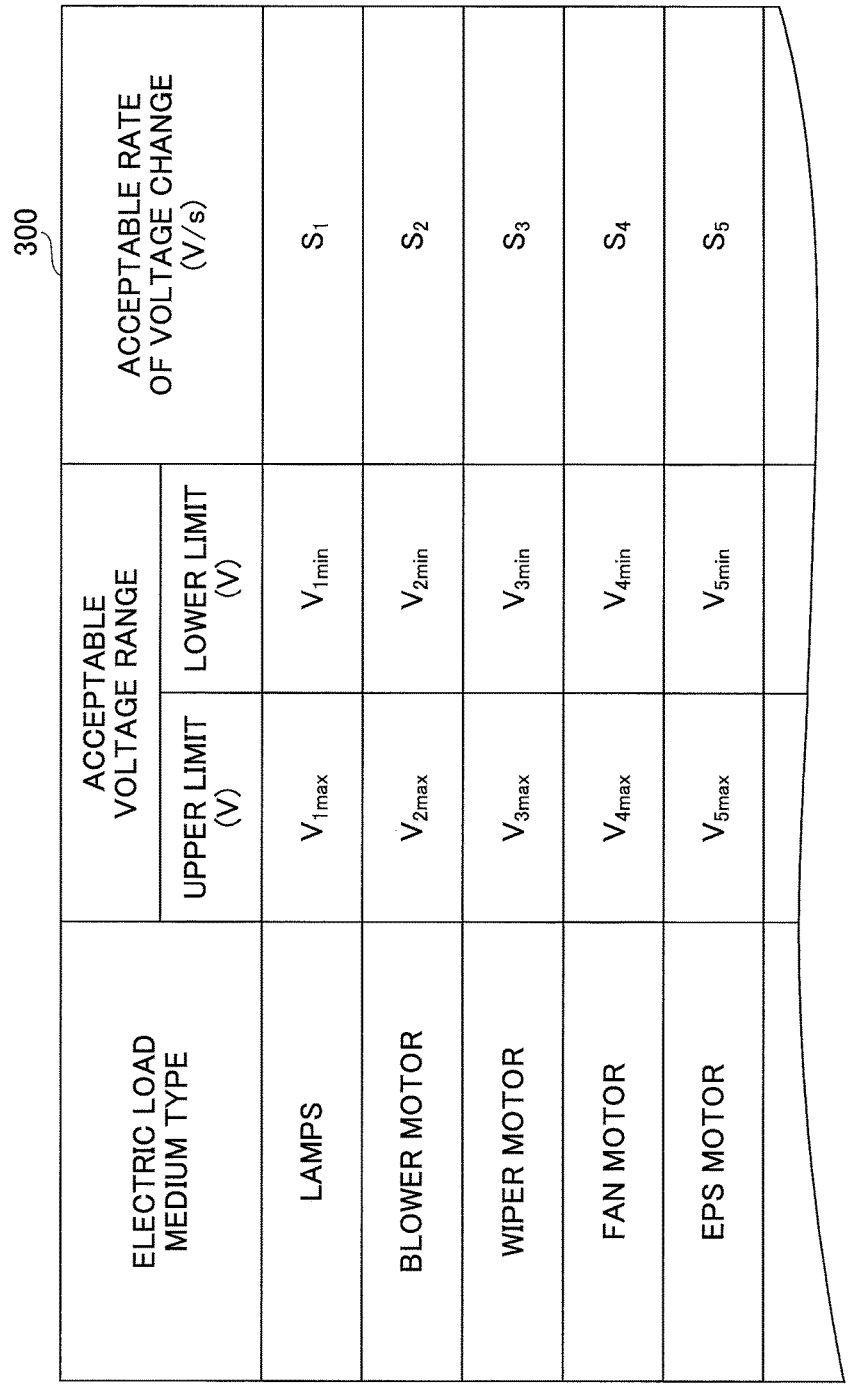
FIG. 3 illustrates one example of electric load medium information.

Next, the electric load medium information 300 registered in the electric load medium information storage part 122 of in the EFI ECU 120 will be described. FIG. 3 illustrates one example of the electric load medium information 300.

As shown in FIG. 3, the electric load medium information 300 has information items, "electric load medium type", "acceptable voltage range", and "acceptable rate of voltage change".

In the item "electric load medium type", the electric load media 160 included in the vehicle are registered. In the case of the generation voltage control system 100 shown in FIG. 1, the electric load media 160 include the lamps 161, the blower motor 162, the wiper motor 163, the fan motor 164, and the EPS motor 165. Therefore, in the item "electric load medium type", these electric load media are registered.

In the item "acceptable voltage range", "upper limit (V)" and "lower limit (V)" are included. There, the acceptable upper limit and lower limit of the supply voltage from the generator 141 are registered. The acceptable upper limit and lower limit of the supply voltage indicate the voltage range of the supply voltage applied to the electric load media within which the vehicle occupants do not have an unacceptable uncomfortable feeling.

For example, in case of the electric load medium type="lamps", the upper limit ($V_{1max}$) and the lower limit ($V_{1min}$) are registered. The range defined by the upper limit ($V_{1max}$) and the lower limit ($V_{1min}$) is a range within which the vehicle occupants can accept the uncomfortable feeling caused by the light quantity fluctuations (flickering) of the lamps 161 that are the fluctuations in the lamp outputs.

In the same way, in case of the electric load medium type="blower motor", the upper limit ($V_{2max}$) and the lower limit ($V_{2min}$) are registered. The range defined by the upper limit ($V_{2max}$) and the lower limit ($V_{2min}$) is a range within which the vehicle occupants can accept the uncomfortable feeling caused by the blower air flow fluctuations that are the output fluctuations of the blower motor 162.

In case of the electric load medium type="wiper motor", the upper limit ($V_{3max}$) and the lower limit ($V_{min}$) are registered. The range defined by the upper limit ($V_{3max}$) and the lower limit ($V_{3min}$) is a range within which the vehicle occupants can accept the uncomfortable feeling caused by the moving speed fluctuations of the wiper that are the output fluctuations of the wiper motor 163.

In case of the electric load medium type="fan motor", the upper limit ($V_{4max}$) and the lower limit ($V_{4min}$) are registered. The range defined by the upper limit ($V_{4max}$) and the lower limit ($V_{4min}$) is a range within which the vehicle occupants can accept the uncomfortable feeling caused by the air flow fluctuations of the electric fan caused by the output fluctuations of the fan motor 164.

In case of the electric load medium type="EPS motor", the upper limit ($V_{5max}$) and the lower limit ($V_{5min}$) are registered. The range defined by the upper limit ($V_{5max}$) and the lower limit ($V_{5min}$) is a range within which the vehicle driver can accept the uncomfortable feeling caused by the steering speed fluctuations that are the output fluctuations of the EPS motor 165 when the vehicle driver operates the steering part 115.

In the item "acceptable rate of voltage change", the upper limit of the rate of change of the voltage is registered at which changes in the supply voltage applied to the corresponding one of the electric load media 160 are acceptable (i.e., do not give the vehicle occupants (including the driver) an unacceptable uncomfortable feeling).

For example, in case of the electric load medium type="lamps", the upper limit ($S_1$) of the rate of change is registered within which the light quantity fluctuations (flickering) caused by changes in the supply voltage applied to the lamps 161 are not so fast as to give the vehicle occupants an unacceptable uncomfortable feeling.

In case of the electric load medium type="blower motor", the upper limit ($S_2$) of the rate of change is registered within which the blower air flow fluctuations caused by changes in the supply voltage applied to the blower motor 162 are not so fast as to give the vehicle occupants an unacceptable uncomfortable feeling.

In case of the electric load medium type="wiper motor", the upper limit ($S_3$) of the rate of change is registered within which the wiper moving speed fluctuations caused by changes in the supply voltage applied to the wiper motor 163 are not so fast as to give the vehicle occupants an unacceptable uncomfortable feeling.

In case of the electric load medium type="fan motor", the upper limit ($S_4$) of the rate of change is registered within which the electric fan air flow fluctuations caused by changes in the supply voltage applied to the fan motor 164 are not so fast as to give the vehicle occupants an unacceptable uncomfortable feeling.

In case of the electric load medium type="EPS motor", the upper limit ($S_5$) of the rate of change is registered within which the steering speed fluctuations caused by changes in the supply voltage applied to the EPS motor 165 are not so fast as to give the vehicle occupants an unacceptable uncomfortable feeling.

4. Functional Configuration of First Arbitration Part of EFI ECU

Figure 4:
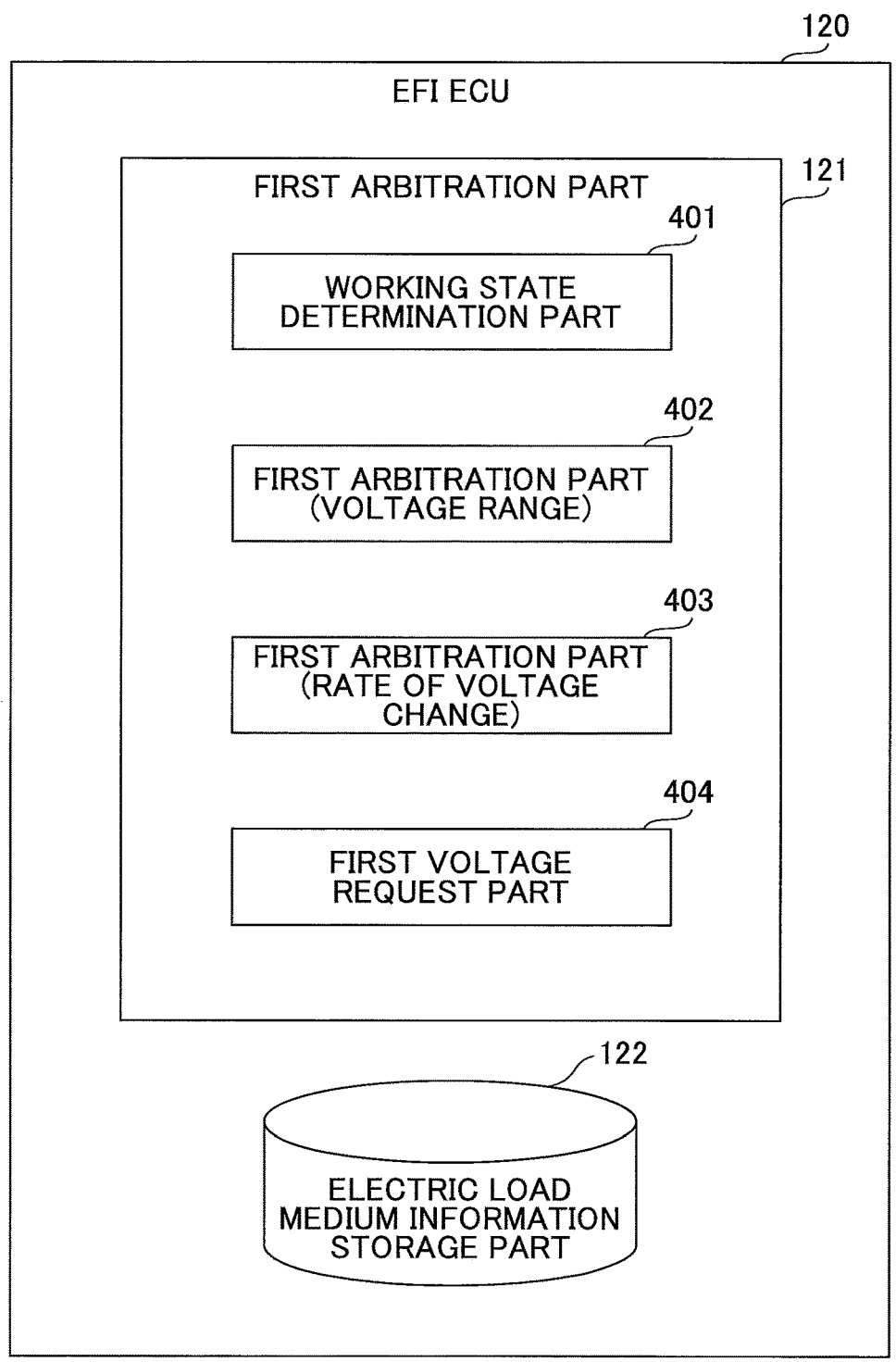
FIG. 4 illustrates one example of a functional configuration of an EFI ECU.

Next, a functional configuration of the first arbitration part 121 implemented by the EFI ECU 120 will be described. FIG. 4 illustrates one example of a first arbitration part 121. As shown in FIG. 4, the first arbitration part 121 includes a working state determination part 401, a first arbitration part (voltage range) 402, a first arbitration part (rate of voltage change) 403, and a first voltage request part 404.

The working state determination part 401 acquires the activation signals transmitted by the electric load medium operation part 110, and determines whether any of the electric load media 160 are working. The working state determination part 401 sends the determination result to the first arbitration part (voltage range) 402 and the first arbitration part (rate of voltage change) 403.

The first arbitration part (voltage range) 402 identifies the electric load media that are working based on the determination result sent from the working state determination part 401. Then, the first arbitration part (voltage range) 402 reads the electric load medium information 300 registered in the electric load medium information storage part 122, and acquires the respective acceptable voltage ranges of the identified electric load media.

The first arbitration part (voltage range) 402 then calculates the voltage range where the respective acceptable voltage ranges of the electric load media that are working overlap. The first arbitration part (voltage range) 402 sends the calculated voltage range to the first voltage request part 404. If only one of the electric load media 160 is working, the first arbitration part (voltage range) 402 sends the read acceptable voltage range to the first voltage request part 404.

The first arbitration part (rate of voltage change) 403 identifies the electric load media that are working based on the determination result sent from the working state determination part 401. Then, the first arbitration part (rate of voltage change) 403 reads the electric load medium information 300 registered in the electric load medium information storage part 122, and acquires the respective acceptable rates of voltage change of the identified electric load media.

The first arbitration part (rate of voltage change) 403 then selects the lowest one of the respective acceptable rates of voltage change of the electric load media that are working. The first arbitration part (rate of voltage change) 403 sends the selected rate of voltage change to the first voltage request part 404. If only one of the electric load media 160 is working, the first arbitration part (rate of voltage change) 403 sends the read acceptable rate of voltage change to the first voltage request part 404.

The first voltage request part 404 generates the first voltage request (that includes the generation voltage (i.e., the voltage range and the rate of voltage change) considering working of the electric load medium) and transmits it to the power train ECU 130. That is, the first voltage request part 404 generates the first voltage request for requesting the voltage range sent from the first arbitration part (voltage range) 402, and the rate of voltage change sent from the first arbitration part (rate of voltage change) 403. The first voltage request part 404 transmits the generated first voltage request to the power train ECU 130.

5. Flow of First Arbitration Process by First Arbitration Part

Figure 5:
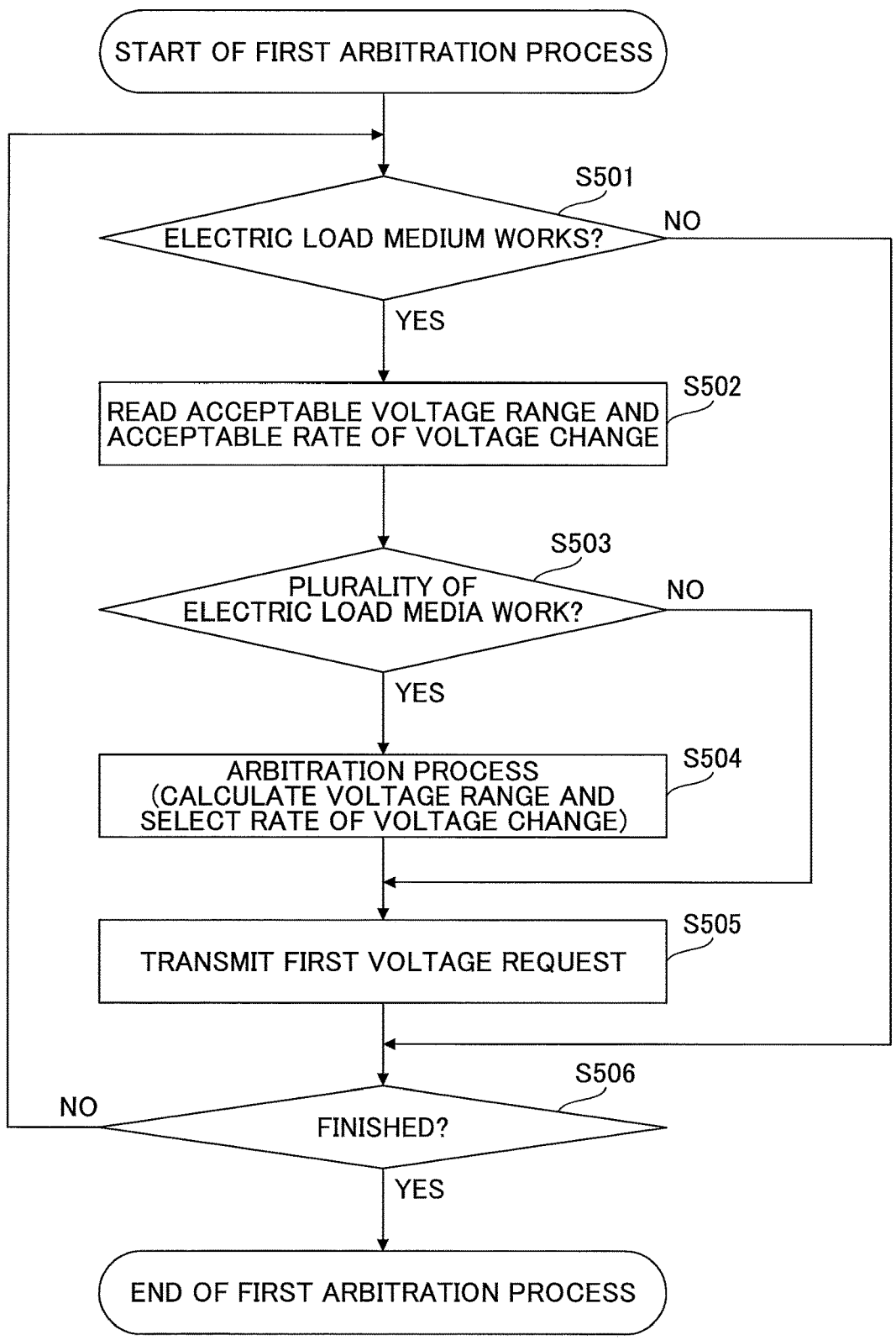
FIG. 5 is a flowchart illustrating a flow of a first arbitration process carried out by a first arbitration part.

Next, a flow of the first arbitration process carried out by the first arbitration part 121 of the EFI ECU 120 will be described. FIG. 5 is a flowchart illustrating a flow of the first arbitration process, which is started when the first arbitration part 121 is started as a result of, for example, the engine 151 being started. The flow of the first arbitration process is ended when the first arbitration part 121 is stopped as a result of, for example, the engine 151 being stopped (whereby an instruction to end the first arbitration process, mentioned later, is generated).

In step S501, the working state determination part 401 determines whether any of the electric load media 160 are working. If the activation signals are acquired from the electric load medium operation part 110, the working state determination part 401 determines that some of the electric load media 160 are working. In this case, the working state determination part 401 determines, based on the acquired activation signals, the electric load media which are working, and sends the determination result to the first arbitration part (voltage range) 402 and the first arbitration part (rate of voltage change) 403.

In step S502, the first arbitration part (voltage range) 402 identifies the electric load media that are working based on the determination result sent from the working state determination part 401, and reads the electric load medium information 300 registered in the electric load medium information storage part 122. Thus, the first arbitration part 402 acquires the acceptable voltage ranges of the identified electric load media.

The first arbitration part (rate of voltage change) 403 identifies the electric load media that are working based on the determination result sent from the working state determination part 401, and reads the electric load medium information 300 registered in the electric load medium information storage part 122. Thus, the first arbitration part 403 acquires the acceptable rates of voltage change of the identified electric load media. Thereafter, step S503 is carried out.

In step S503, the working state determination part 401 determines whether a plurality of the electric load media are working. If a plurality of the activation signals are acquired from the electric load medium operation part 110, the working state determination part 401 determines that a plurality of the electric load media are working (YES in step S503). In this case, step S504 is then carried out.

In step S504, the first arbitration part (voltage range) 402 calculates the overlapping voltage range where the plurality of acceptable voltage ranges overlap. The first arbitration part (rate of voltage change) 403 selects the lowest one of the plurality of acceptable rates of voltage change. Thereafter, the thus calculated voltage range and selected rate of voltage change are sent to the first voltage request part 404, and step S505 is carried out.

If it is determined in step S503 that the only one electric load medium is working (NO in step S503), the read acceptable voltage range and the read acceptable rate of voltage change are sent to the first voltage request part 404. Thereafter, step S505 is carried out.

In step S505, the first voltage request part 404 generates the first voltage request. Actually, the first voltage request part 404 generates the first voltage request for requesting the voltage range and the rate of voltage change sent to the first voltage request part 404 in step S503 or S504. The first voltage request part 404 transmits the generated first voltage request to the power train ECU 130.

In step S506, the working state determination part 401 determines whether it has received an instruction to end the first arbitration process. If the first arbitration process determines in step S506 that it has not received an instruction to end the first arbitration process, step S501 is carried out. If the first arbitration process determines in step S506 that it has received the above-mentioned instruction to end the first arbitration process, the first arbitration process is ended.

6. Actual Example of First Arbitration Process

Figure 6:
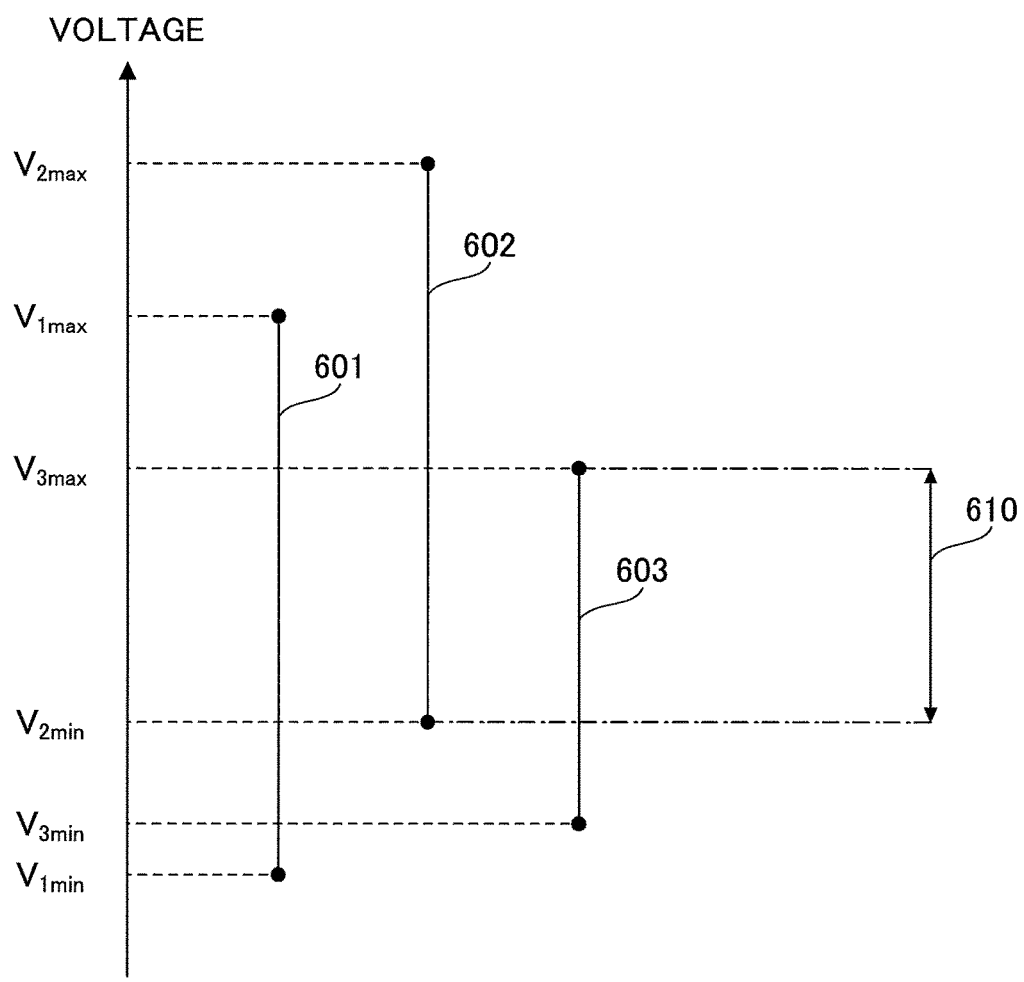
FIG. 6 illustrates an actual example of the first arbitration process.

Next, an actual example of the first arbitration process will be described where the voltage range is calculated. FIG. 6 illustrates an actual example of the first arbitration process. In the example of FIG. 6, it is assumed that, as the electric load media, the lamps 161, the blower motor 162, and the wiper motor 163 are working. As shown in FIG. 6, as a result of the lamps 161 working, the corresponding acceptable voltage range 601, i.e., the upper limit=$V_{1max}$ and the lower limit=$V_{1min}$, are read. As a result of the blower motor 162 working, the corresponding acceptable voltage range 602, i.e., the upper limit=$V_{2max}$ and the lower limit=$V_{2min}$, are read. As a result of the wiper motor 163 working, the corresponding acceptable voltage range 603, i.e., the upper limit=$V_{3max}$ and the lower limit=$V_{3min}$, are read.

As can be seen from FIG. 6, the voltage range where the acceptable voltage range 601 of the lamps 161, the acceptable voltage range 602 of the blower motor 162, and the acceptable voltage range 603 of the wiper motor 163 overlap is the range 610. Therefore, the first arbitration part (voltage range) 402 calculates the voltage range 610.

Figure 7:
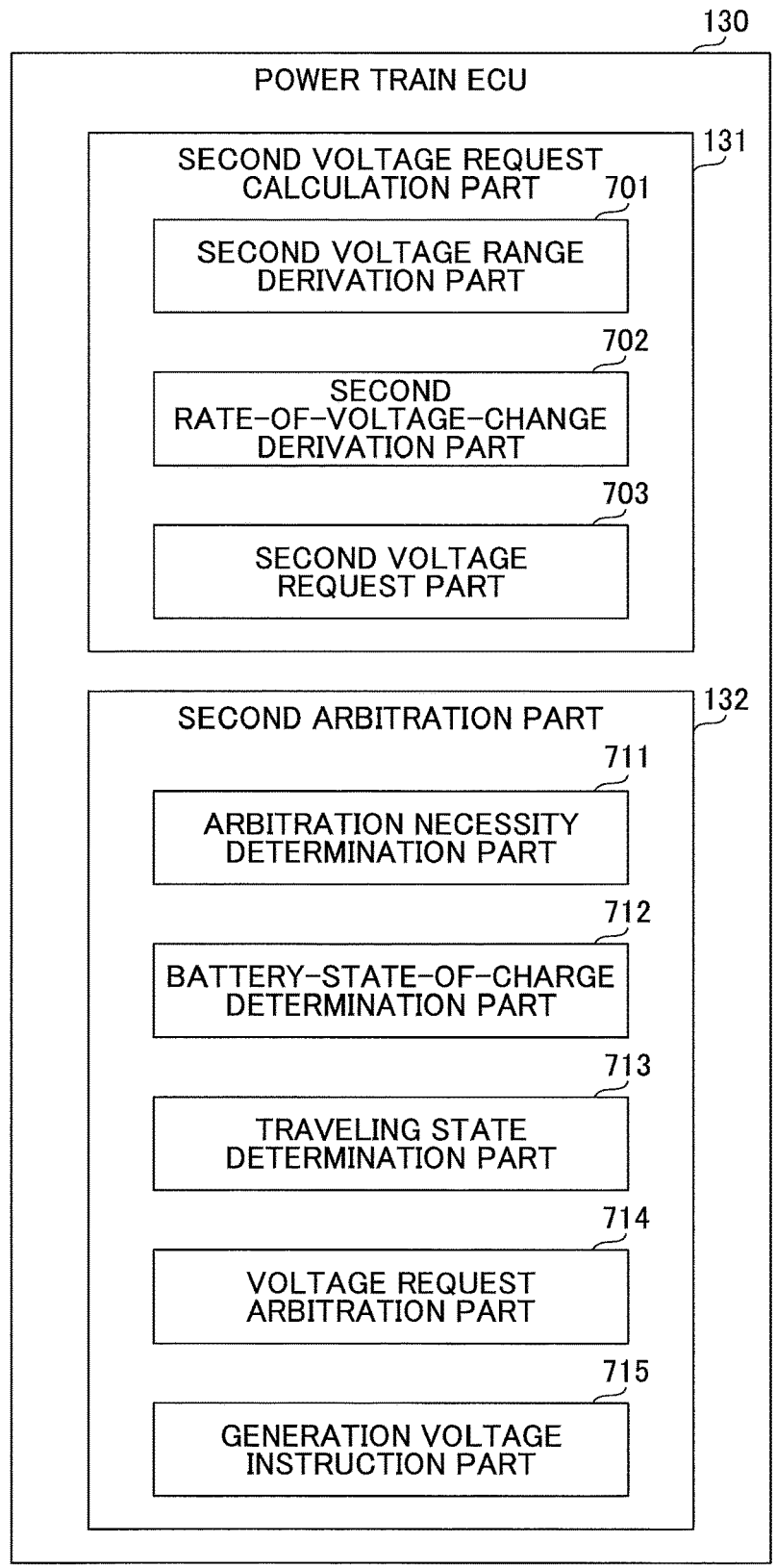
FIG. 7 illustrates one example of a functional configuration of the power train ECU.

7. Functional Configuration of Second Voltage Request Calculation Part and Second Arbitration Part of Power Train ECU A functional configuration of the second voltage request calculation part 131 and the second arbitration part 132 implemented by the power train ECU 130 will be described. FIG. 7 illustrates one example of a functional configuration of the second voltage request calculation part 131 and the second arbitration part 132.

As shown in FIG. 7, the second voltage request calculation part 131 includes a second voltage range derivation part 701, a second rate-of-voltage-change derivation part 702, and a second voltage request part 703.

The second voltage range derivation part 701 determines the vehicle's traveling state (i.e., whether the vehicle is traveling at a constant speed, during acceleration, or during deceleration), and a value that indicates the state of charge of the battery 142 (i.e., whether the value that indicates the current state of charge is less than or equal to the predetermined threshold). The second voltage range derivation part 701 then derives the voltage range of the generation voltage for controlling the generator 141, based on the determination result of the vehicle's traveling state and the determination result of the value that indicates the state of charge of the battery 142. The second voltage range derivation part 701 sends the derived voltage range to the second voltage request part 703.

For example, if the vehicle's traveling state is during traveling at a constant speed or during acceleration, the second voltage range derivation part 701 derives the voltage range "$12.5\pm\alpha[V]$" without regard to the state of charge of the battery 142.

If the vehicle's traveling state is during deceleration, and the value that indicates the state of charge of the battery 142 exceeds the predetermined threshold, the second voltage range derivation part 701 derives the voltage range of the generation voltage considering the vehicle's drivability "$14.8\pm\beta[V]$".

If the vehicle's traveling state is during deceleration, and the value that indicates the state of charge of the battery 142 is less than or equal to the predetermined threshold, the second voltage range derivation part 701 derives the voltage range of the generation voltage considering the vehicle's drivability "$12.5\pm\gamma[V]$". Thus, even if the vehicle's traveling state is during deceleration, the generation voltage considering the vehicle's drivability is reduced if the value that indicates the state of charge of the battery 142 is less than or equal to the predetermined threshold. This is because, if the same generation voltage were used even if the battery 142 is in a low state of charge, the current that flows from the generator 141 to the battery 142 would increase, the torque of the generator 141 would increase accordingly, and as a result, the deceleration effect due to regenerative braking would increase.

In the same way, the second rate-of-voltage-change derivation part 702 determines the vehicle's traveling state and the value that indicates the state of charge of the battery 142. The second rate-of-voltage-change derivation part 702 derives the rate of voltage change of the generation voltage for controlling the generator 141, based on the determination result of the vehicle's traveling state and the determination result of the value that indicates the state of charge of the battery 142. The second rate-of-voltage-change derivation part 702 sends the derived rate of voltage change to the second voltage request part 703.

The second voltage request part 703 outputs the second voltage request for requesting the generation voltage (i.e., the voltage range of the generation voltage sent from the second voltage range derivation part 701, and the rate of voltage change of the generation voltage sent from the second rate-of-voltage-change derivation part 702) to the second arbitration part 132.

As shown in FIG. 7, the second arbitration part 132 includes an arbitration necessity determination part 711, a battery-state-of-charge determination part 712, the traveling state determination part 713, a voltage request arbitration part 714, and a generation voltage instruction part 715.

The arbitration necessity determination part 711 determines whether to carry out arbitration between the first voltage request and the second voltage request. Actually, the arbitration necessity determination part 711 determines to carry out arbitration between the first voltage request and the second voltage request if it acquires the first voltage request from the EFI ECU 120 while the power train ECU 130 is sending an instruction for the generation voltage based on the second voltage request to the generator 141. The arbitration necessity determination part 711 determines to not carry out arbitration between the first voltage request and the second voltage request if it does not acquire the first voltage request from the EFI ECU 120.

The arbitration necessity determination part 711 sends the determination result as to whether to carry out the arbitration to the voltage request arbitration part 714.

The battery-state-of-charge determination part 712 receives the battery state signal from the battery 142, and acquires the value that indicates the state of charge of the battery 142.

The battery-state-of-charge determination part 712 compares the acquired value that indicates the state of charge with a predetermined threshold, and determines whether the value that indicates the current state of charge of the battery 142 is less than or equal to the predetermined threshold. The battery-state-of-charge determination part 712 sends the determination result concerning the value that indicates the state of charge of the battery 142 to the voltage request arbitration part 714.

The traveling state determination part 713 determines, as the vehicle's traveling state, at least whether the vehicle is decelerating. In more detail, the traveling state determination part 713 determines whether the vehicle is traveling at a constant speed, accelerating, or decelerating. The traveling state determination part 713 can determine whether the vehicle is decelerating by determining whether the brake pedal has been depressed by the driver, for example. The traveling state determination part 713 sends the determination result concerning the vehicle's traveling state to the voltage request arbitration part 714.

The voltage request arbitration part 714 carries out arbitration between the first voltage request and the second voltage request for determining the generation voltage (i.e., the voltage range and the rate of voltage change) to be included in the generation voltage instruction signal to be transmitted to the generator 141.

Actually, if the voltage request arbitration part 714 receives the determination result to not carry out arbitration from the arbitration necessity determination part 711, the voltage request arbitration part 714 determines to include the voltage range and the rate of voltage change requested by the second voltage request transmitted from the second voltage request part 703 in the generation voltage instruction signal. In this case, the voltage request arbitration part 714 sends the second voltage request to the generation voltage instruction part 715.

If the voltage request arbitration part 714 receives the determination result to carry out arbitration from the arbitration necessity determination part 711, the voltage request arbitration part 714 reads the determination result sent from the battery-state-of-charge determination part 712 and the determination result sent from the traveling state determination part 713. The voltage request arbitration part 714 carries out arbitration between the first voltage request and the second voltage request by selecting the voltage request, in a manner of the following items 1), 2), 3), and 4), based on the read determination results.

1) If the value that indicates the state of charge of the battery 142 is less than or equal to the predetermined threshold, and the vehicle's traveling state is during deceleration, the voltage request arbitration part 714 selects the second voltage request.

2) If the value that indicates the state of charge of the battery 142 is less than or equal to the predetermined threshold, and the vehicle's traveling state is not during deceleration (i.e., vehicle is traveling at a constant speed, or accelerating), the voltage request arbitration part 714 selects the first voltage request.

3) If the value that indicates the state of charge of the battery 142 is greater than the predetermined threshold, and the vehicle's traveling state is during deceleration, the voltage request arbitration part 714 selects the first voltage request.

4) If the value that indicates the state of charge of the battery 142 is greater than the predetermined threshold, and the vehicle's traveling state is not during deceleration (i.e., it is during traveling at a constant speed, or during acceleration), the voltage request arbitration part 714 selects the first voltage request.

In other words, (i) if the value that indicates the state of charge of the battery 142 is less than or equal to the predetermined threshold (a first condition), and the vehicle's traveling state is during deceleration (a second condition), the voltage request arbitration part 714 selects the second voltage request. In any of the other cases (ii), (iii) and (iv), the voltage request arbitration part 714 selects the first voltage request.

The other case (ii) is a case where the value that indicates the state of charge of the battery 142 is less than or equal to the predetermined threshold (the first condition), and the vehicle's traveling state is during traveling at a constant speed or during acceleration (the second condition).

The other case (iii) is a case where the value that indicates the state of charge of the battery 142 is greater than the predetermined threshold (the first condition), and the vehicle's traveling state is during deceleration (the second condition).

The other case (iv) is a case where the value that indicates the state of charge of the battery 142 is greater than the predetermined threshold (the first condition), and the vehicle's traveling state is during traveling at a constant speed or during acceleration (the second condition).

Thus, (i) if the battery 142 is in a low state of charge, and the vehicle's traveling state is during deceleration, the current that flows into the battery 142 from the generator 141 increases. As a result, the torque of the generator 141 increases, and the deceleration effect caused by regenerative braking increases. Therefore, the voltage request arbitration part 714 selects the second voltage request. That is, the voltage request arbitration part 714 carries out arbitration in such a manner as to reduce remarkable degradation in drivability.

(ii) If the battery 142 is in a low state of charge, and the vehicle's traveling state is not during deceleration, likelihood that the current that flows into the battery 142 increases is low in comparison to a case where the battery 142 is in a low state of charge, and the vehicle's traveling state is during deceleration. Therefore, the voltage request arbitration part 714 selects the first voltage request.

(iii) If the battery 142 is in a high state of charge, and the vehicle's traveling state is during deceleration, likelihood that the current that flows into the battery 142 increases is low in comparison to a case where the battery 142 is in a low state of charge, and the vehicle's traveling state is during deceleration. Therefore, the voltage request arbitration part 714 selects the first voltage request.

In the same way, (iv) if the battery 142 is in a high state of charge, and the vehicle's traveling state is not during deceleration, likelihood that the current that flows into the battery 142 increases is low in comparison to the battery 142 is in a low state of charge, and the vehicle's traveling state is during deceleration. Therefore, the voltage request arbitration part 714 selects the first voltage request.

That is, the voltage request arbitration part 714 carries out arbitration in such a manner as to give priority to the request for the generation voltage based on the electric load medium if likelihood that the drivability is remarkably degraded is low.

The voltage request arbitration part 714 determines to include the generation voltage (i.e., the voltage range and rate of voltage change) requested by the selected voltage request in the generation voltage instruction signal. Then, the voltage request arbitration part 714 sends the selected voltage request to the generation voltage instruction part 715.

The generation voltage instruction part 715 generates the generation voltage instruction signal based on the generation voltage (voltage range and rate of voltage change) included in the voltage request received from the voltage request arbitration part 714, and transmits the generation voltage instruction signal to the generator 141.

8. Flow of Second Arbitration Process of Second Arbitration Part

Figure 8:
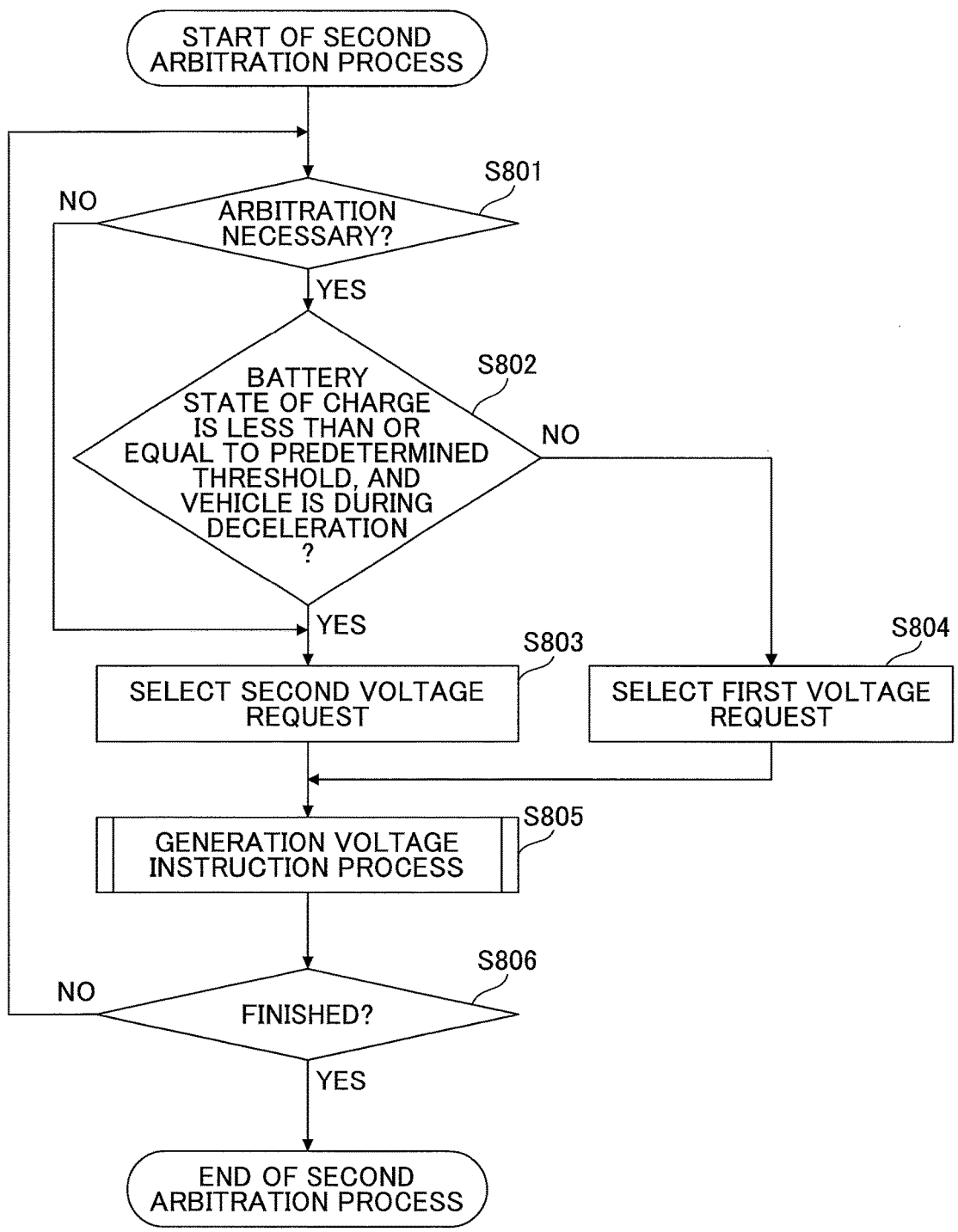
FIG. 8 is a flowchart illustrating a flow of a second arbitration process carried out by a second arbitration part.

Next, a flow of the second arbitration process carried out by the second arbitration part 132 of the power train ECU 130 will be described. FIG. 8 is a flowchart illustrating a flow of the second arbitration process carried out by the second arbitration part 132. The process of the flow of the second arbitration process is started when the second arbitration part 132 is started as a result of, for example, the engine 151 being started. The flow of the second arbitration process is ended when the second arbitration part 132 is stopped as a result of, for example, the engine 151 being stopped (whereby an instruction to end the second arbitration process, mentioned later, is generated). Note that, after the process of the flow starts as a result of the second arbitration part 132 starting, the power train ECU 130 generates the generation voltage instruction signal based on the second voltage request sent from the second voltage request calculation part 131, and transmits the generation voltage instruction signal to the generator 141.

In step S801, the arbitration necessity determination part 711 determines whether the first voltage request is sent, and thus, determines whether to carry out arbitration. If the first voltage request is sent, this means that both the first voltage request and the second voltage request have been sent. Therefore, the arbitration necessity determination part 711 determines to carry out arbitration, and carries out step S802. If the arbitration necessity determination part 711 determines that the first voltage request is not sent, it determines to not carry out arbitration, and carries out step S803.

In step S802, the battery-state-of-charge determination part 712 determines whether the value that indicates the state of charge of the battery 142 is less than or equal to the predetermined threshold. The traveling state determination part 713 determines whether the vehicle's traveling state is during deceleration. If the battery-state-of-charge determination part 712 determines in step S802 that the value that indicates the state of charge of the battery 142 is greater than the predetermined threshold, step S804 is carried out. Also if the traveling state determination part 713 determines that the vehicle's traveling state is not during deceleration, step S804 is carried out. In step S804, the voltage request arbitration part 714 selects the first voltage request.

If the battery-state-of-charge determination part 712 determines in step S802 that the value that indicates the state of charge of the battery 142 is less than or equal to the predetermined threshold, and the traveling state determination part 713 determines that the vehicle's traveling state is during deceleration, step S803 is carried out. In step S803, the voltage request arbitration part 714 selects the second voltage request.

Also if the arbitration necessity determination part 711 determines, in step S801, to not carry out arbitration, step S803 is carried out, and the voltage request arbitration part 714 selects the second voltage request.

In step S805, the voltage request arbitration part 714 determines the generation voltage (the voltage range and rate of voltage change) to be used to generate the generation voltage instruction signal based on the selection result. The generation voltage instruction part 715 generates the generation voltage instruction signal based on the determination result, and transmits the generation voltage instruction signal to the generator 141. Details of the generation voltage instruction process (step S805) will be described later.

In step S806, the arbitration necessity determination part 711 determines whether it has received an instruction to end the second arbitration process. If the arbitration necessity determination part 711 determines in step S806 that it has not received an instruction to end the second arbitration process, step S801 is carried out again. If the arbitration necessity determination part 711 determines in step S806 that it has received the above-mentioned instruction to end the second arbitration process, the second arbitration process is ended.

Figure 9:
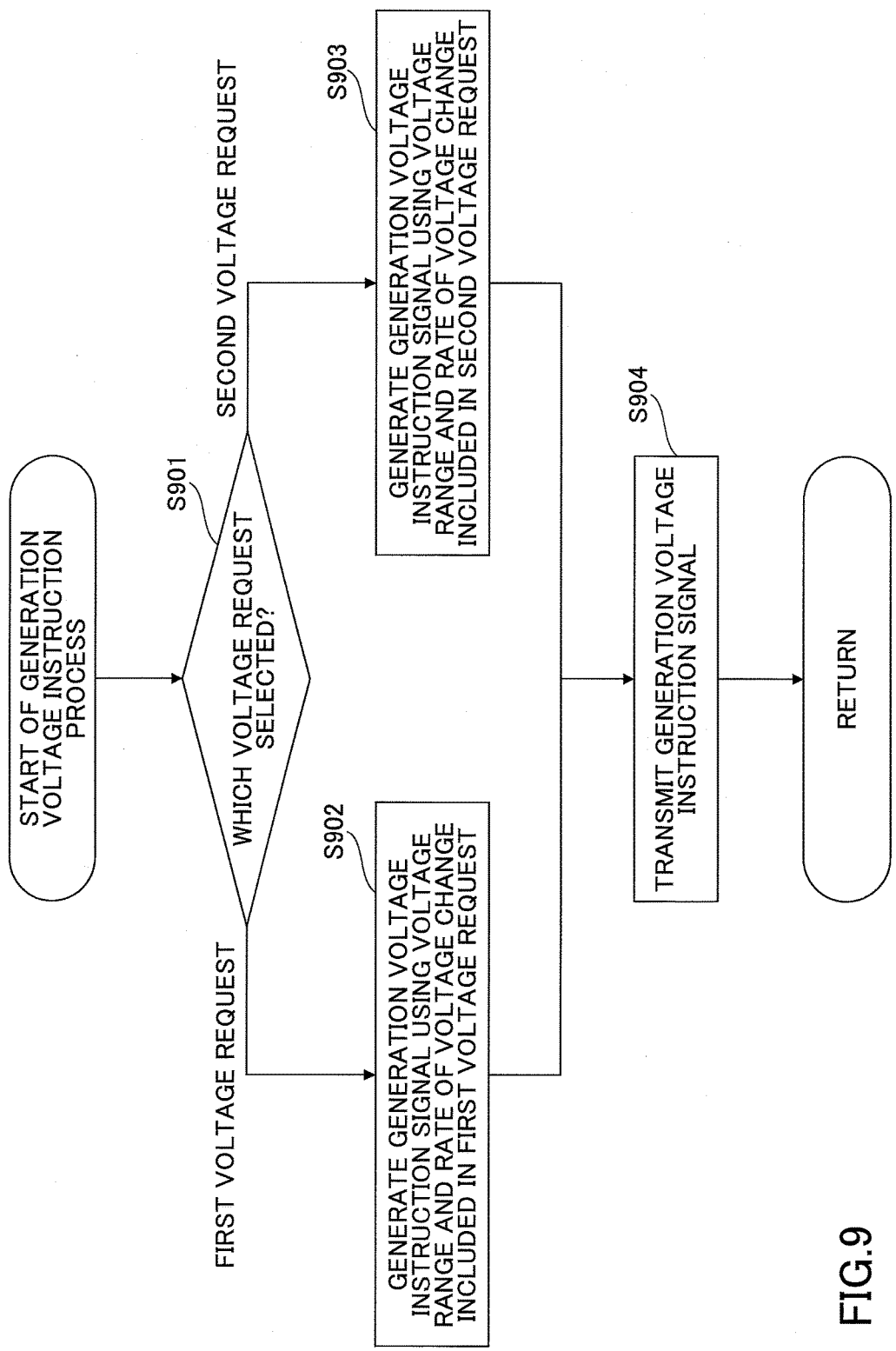
FIG. 9 is a flowchart illustrating a flow of a generation voltage instruction process carried out by the second arbitration part.

9. Flow of Generation Voltage Instruction Process of Generation Voltage Instruction Part Next, a flow of the generation voltage instruction process carried out by the second arbitration part 715 of the power train ECU 130 will be described. FIG. 9 is a flowchart illustrating the flow of the generation voltage instruction process.

In step S901, the generation voltage instruction part 715 determines whether the voltage request arbitration part 714 has selected the first voltage request or the second voltage request. If the first voltage request has been sent from the voltage request arbitration part 714, the generation voltage instruction part 715 determines that the first voltage request has been selected. If the second voltage request has been sent from the voltage request arbitration part 714, the generation voltage instruction part 715 determines that the second voltage request has been selected.

If the generation voltage instruction part 715 determines in step S901 that the first voltage request has been selected, step S902 is carried out. In step S902, the generation voltage instruction part 715 generates the generation voltage instruction signal using the generation voltage (the voltage range and rate of voltage change considering working of the electric load medium) requested by the first voltage request.

If the generation voltage instruction part 715 determines in step S901 that the second voltage request has been selected, step S903 is carried out. In step S903, the generation voltage instruction part 715 generates the generation voltage instruction signal using the generation voltage (the voltage range and rate of voltage change considering the vehicle's drivability) requested by the second voltage request.

In step S904, the generation voltage instruction part 715 transmits the generation voltage instruction signal generated in step S902 or the generation voltage instruction signal generated in step S903 to the generator 141.

10. Actual Example of Generation Voltage Instruction Process

Figure 10:
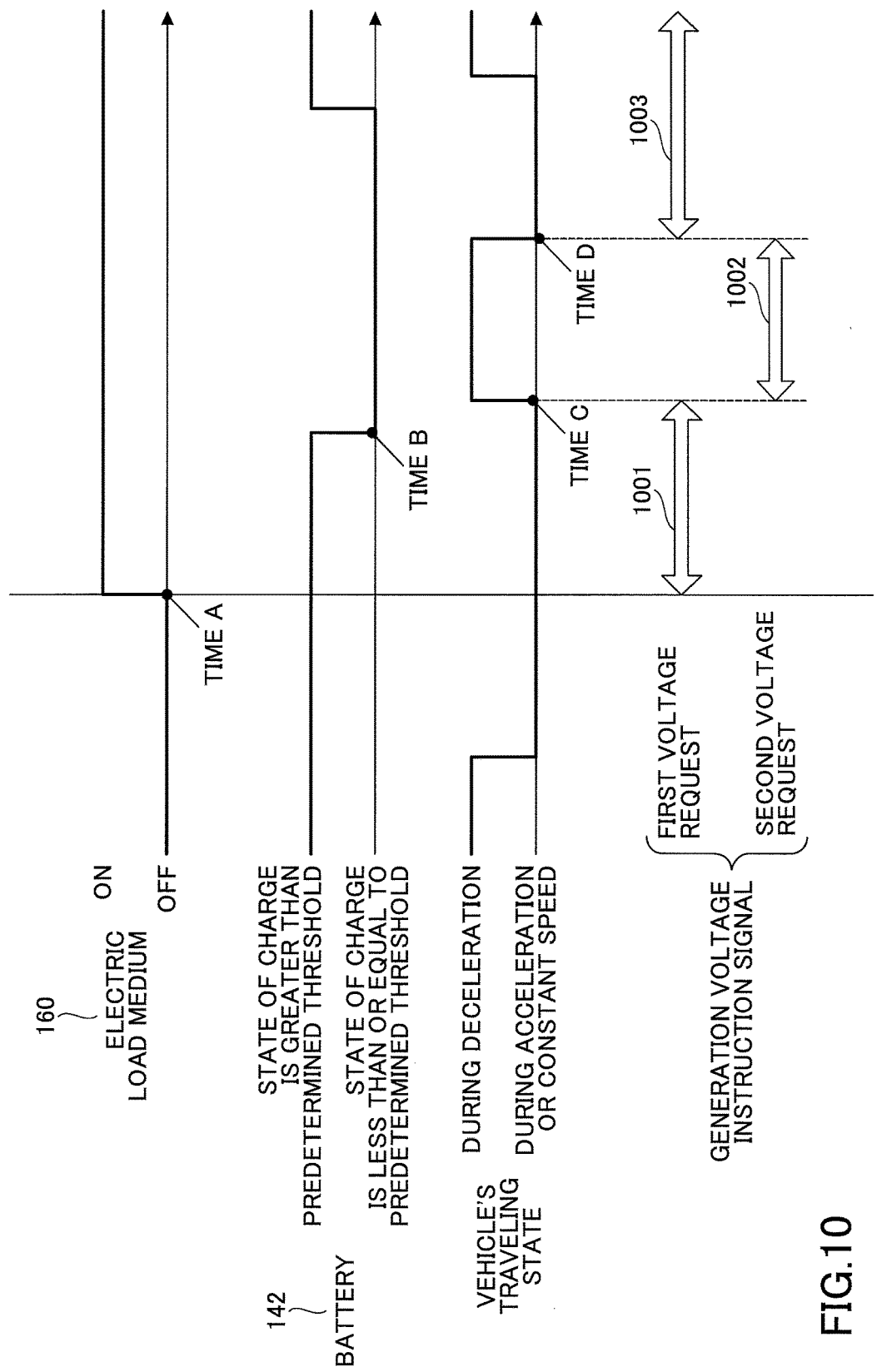
FIG. 10 illustrates an actual example of the generation voltage instruction process.

Next, an actual example of the generation voltage instruction process (FIG. 9) will be described. FIG. 10 illustrates an actual example of the generation voltage instruction process. The abscissa in FIG. 10 represents the elapse of time.

In the example of FIG. 10, at time A, any one of the electric load media 160 starts working. When the electric load medium 160 starts working, the value that indicates the state of charge of the battery 142 is greater than the predetermined threshold, as shown. At time B, the value that indicates the state of charge of the battery 142 becomes less than or equal to the predetermined threshold. Whereas, at this time, the vehicle's traveling state is during acceleration or traveling at a constant speed. Therefore, until time C at which the vehicle's traveling state becomes a state where vehicle is during deceleration (i.e., during the period 1001), the generation voltage instruction part 715 generates the generation voltage instruction signal based on the first voltage request, and transmits the generation voltage instruction signal to the generator 141. That is, in the period 1001, the generator 141 carries out generation based on the voltage range (i.e., the voltage range considering working of the electric load medium) included in the first voltage request.

After the vehicle's traveling state becomes the state where vehicle is during deceleration at time C, the generation voltage instruction part 715 generates the generation voltage instruction signal based on the second voltage request, and transmits the generation voltage instruction signal to the generator 141. As shown in FIG. 10, the state where the value that indicates the state of charge of the battery 142 is the less than or equal to predetermined threshold, and the vehicle's traveling state is during deceleration continues until time D. Therefore, during the period 1002 from time C through time D, the generator 141 carries out generation based on the voltage range included in the second voltage request (the voltage range considering the vehicle's drivability). Note that, the change of the voltage range in time C is carried out according to the rate of voltage change included in the second voltage request (i.e., the rate of voltage change considering the vehicle's drivability).

After time D at which the vehicle's traveling state changes to a state where the vehicle is during acceleration or traveling at a constant speed, the generation voltage instruction part 715 generates the generation voltage instruction signal based on the first voltage request. Thereafter, during the period 1003, the generator 141 carries out generation based on the voltage range included in the first voltage request (i.e., the voltage range considering working of the electric load medium). Note that, the change of the voltage range at time D is carried out according to the rate of voltage change included in the first voltage request (i.e., the rate of voltage change considering working of the electric load medium).

11. Summary of First Embodiment

As can be seen from the description above, the generation voltage control system 100 according to the first embodiment has the following features:

a) If the electric load medium is working, the generation voltage considering working of the electric load medium is requested. The generation voltage considering the vehicle's traveling state and the battery state of charge is requested without regard to whether the electric load medium is working.

b) If both the generation voltage considering working of the electric load medium and the generation voltage considering the vehicle's traveling state and the battery state of charge are requested, it is determined whether the battery state of charge is less than or equal to the predetermined threshold, and whether the vehicle's traveling state is during deceleration.

c) If it is determined that the battery state of charge is less than or equal to the predetermined threshold, and the vehicle's traveling state is during deceleration, the generation voltage instruction signal is generated based on the generation voltage considering the vehicle's traveling state and the battery state of charge (i.e., the generation voltage considering the vehicle's drivability). Otherwise, the generation voltage instruction signal is generated based on the generation voltage considering working of the electric load medium.

Thus, according to the first embodiment, it is possible to control the generation voltage of the generator when a predetermined electric load medium is working in such a manner as to avoid remarkable degradation in the drivability which may otherwise occur during deceleration of the vehicle while the battery is in a low state of charge.

That is, if the generator carries out generation at the generation voltage considering the electric load medium that is working even if the value that indicates the battery state of charge is less than or equal to the predetermined threshold and the vehicle is during deceleration, the drivability of the vehicle may be remarkably degraded. In the same case, if the generator carries out generation at the generation voltage considering the vehicle's traveling state as in the first embodiment, it is possible to avoid remarkable degradation in the drivability of the vehicle.

According to the embodiments of the present disclosure, it is possible to control the generation voltage of the generator when the predetermined electric load medium is working in such a manner as to avoid remarkable degradation in the drivability which may otherwise occur during deceleration of the vehicle.

Second Embodiment

According to the first embodiment described above, the voltage request arbitration part 714 selects between the first voltage request and the second voltage request based on the vehicle's traveling state and the battery state of charge. The generation voltage instruction part 715 then generates the generation voltage instruction signal based on the voltage request selected by the voltage request arbitration part 714.

However, embodiments of the present disclosure are not limited thereto. For example, the voltage request arbitration part 714 can be configured to determine respective priorities of the first voltage request and the second voltage request based on the vehicle's traveling state and the battery state of charge. In this case, the generation voltage instruction part 715 can be configured to then generate the generation voltage instruction signal based on the generation voltage included in one of the first voltage request and the second voltage request which has the higher priority determined by the voltage request arbitration part 714.

Further, according to the first embodiment, the voltage request arbitration part 714 selects between the first voltage request and the second voltage request based on the vehicle's traveling state and the battery state of charge. The generation voltage instruction part 715 generates the generation voltage instruction signal based on the voltage request selected by the voltage request arbitration part 714. However, embodiments of the present disclosure are not limited thereto. For example, it is also possible that, after selecting between the first voltage request and the second voltage request, the generation voltage depending on (i.e., that can be different from) the generation voltage included in the selected voltage request is generated. In this case, the generation voltage instruction part 715 generates the generation voltage instruction signal based on the generation voltage generated by the voltage request arbitration part 714 (i.e., not the generation voltage itself included in the voltage request but a generation voltage near the generation voltage included in the voltage request).

In this case, it is possible that, for example, even when the second voltage request is selected and the generation voltage instruction signal is transmitted to the generator 141, different generation voltage instruction signals can be transmitted to the generator 141 depending on whether the first voltage request has been acquired or not. That is, if the first voltage request has not been acquired, the generation voltage included in the second voltage request can be included in the generation voltage instruction, which is then transmitted to the generator. On the other hand, if the first voltage request has been acquired, the generation voltage depending on (i.e., that can be different from) the generation voltage included in the second voltage request can be included in the generation voltage instruction, which is then transmitted to the generator.

Further, according to the first embodiment, the second voltage request calculation part 131 derives the voltage range and the rate of voltage change based on the vehicle's traveling state, the value that indicates the state of charge of the battery 142, and/or the like. However, embodiments of the present disclosure are not limited thereto. For example, it is also possible that, without considering the value that indicates the state of charge of the battery 142, the voltage range and the rate of voltage change are derived based on the vehicle's traveling state. Also in this case, the second arbitration part 132 carries out the second arbitration process based on the vehicle's traveling state and the value that indicates the state of charge of the battery 142. However, if the vehicle's traveling state is a during deceleration and the value that indicates the state of charge of the battery 142 is less than or equal to the predetermined threshold, the second arbitration part 132 corrects the generation voltage included in the second voltage request sent from the second voltage request calculation part 131 and generates the generation voltage instruction signal therewith. More specifically, in this case, the voltage range included in the second voltage request is further reduced and the generation voltage instruction signal is generated therewith.

Further, according to the first embodiment, when the first voltage request is generated, the overlapping voltage range where the plurality of acceptable voltage ranges of the respective identified electric load media overlap is used. However, the acceptable voltage ranges of the respective identified electric load media may not overlap. In such a case, the first voltage request part 404 can generate the first voltage request, for example, using predetermined acceptable voltage range and acceptable rate of voltage change.

Further, according to the first embodiment, when the first voltage request is generated, all of the acceptable voltage ranges and all of the acceptable rates of voltage change of the respective identified electric load media are used. However, embodiments of the present disclosure are not limited thereto. For example, it is also possible that priorities are previously given to the electric load media, respectively, and the voltage range is calculated using the acceptable voltage ranges of the electric load media having the higher priorities among the identified electric load media. It is also possible that the lowest one is selected from among the acceptable rates of voltage change of the electric load media having the higher priorities among the identified electric load media.

Further, according to the first embodiment, the first arbitration part 121 carries out the arbitration, and then the second arbitration part 132 carries out the arbitration. However, embodiments of the present disclosure are not limited thereto. For example, it is also possible that the second arbitration part 132 carries out the arbitration to determine whether the request for the generation voltage considering working of the electric load medium or the request for the generation voltage considering the vehicle's drivability is given priority. Then, if the second arbitration part 132 determines to give priority to the request for the generation voltage considering working of the electric load medium, the first arbitration part 121 can carry out the arbitration.

Thus, the generation voltage determination apparatuses and the generation voltage control systems have been described in the embodiments. However, the present disclosure is not limited to these embodiments. Various modifications and/or improvements such as combinations with part or all of another embodiment(s), a replacement(s) with part of another embodiment(s), and so forth, can be made, depending on actual modes of implementing the present disclosure.

What is claimed is:

1. A generation voltage control system for a vehicle, comprising:
   a generator;
   a battery charged on a basis of power generated by the generator;
   a predetermined electric load medium configured to work as a result of the generator applying a voltage to the predetermined electric load medium;
   a generation voltage instruction apparatus configured to provide an instruction of a generation voltage to the generator;
   a first requesting part configured to request a generation voltage based on working of the predetermined electric load medium, for a case where the predetermined electric load medium works;
   a second requesting part configured to request a generation voltage based on a traveling state of the vehicle;
   a state-of-charge determination part configured to determine whether a state-of-charge of the battery of the vehicle is less than or equal to a predetermined threshold;
   a deceleration determination part configured to determine whether the vehicle is decelerating;
   an arbitration necessity determination part configured to determine that arbitration is necessary between a request from the first requesting part and a request from the second requesting part, for a case where the first requesting part gives the request of a generation voltage based on working of the predetermined electric load medium in a state where the generation voltage instruction apparatus is providing the generator an instruction of a generation voltage on the basis of the request of a generation voltage based on the traveling state of the vehicle given by the second requesting part;
   an arbitration part configured to carry out arbitration of a generation voltage, for a case where the arbitration necessity determination part determines that the arbitration is necessary,
   wherein
   the arbitration part is further configured to carry out arbitration of a generation voltage in such a manner that the generation voltage instruction apparatus provides an instruction of a generation voltage depending on a generation voltage based on a traveling state of the vehicle to the generator, for a case where the state-of-charge determination part determines that the state-of-charge of the battery is less than or equal to the predetermined threshold and the deceleration determination part determines that the vehicle is during deceleration, and the arbitration part is further configured to carry out arbitration of a generation voltage in such a manner that the generation voltage instruction apparatus provides an instruction of a generation voltage based on working of the predetermined electric load medium to the generator, for a case where the state-of-charge determination part determines that the state-of-charge is greater than the predetermined threshold or the deceleration determination part determines that the vehicle is not during deceleration.

2. The generation voltage control system of claim 1 further comprising an electronic control unit, the electronic control unit includes the generation voltage instruction apparatus, the first requesting part, the second requesting part, the state-of-charge determination part, the deceleration determination part, the arbitration necessity determination part, and the arbitration part, the electronic control unit is configured to:

provide the instruction of the generation voltage to the generator;

request a generation voltage based on working of the predetermined electric load medium;

request a generation voltage based on a traveling state of the vehicle;

determine whether the state-of-charge of the battery of the vehicle is less than or equal to the predetermined threshold;

determine whether the vehicle is decelerating;

determine that arbitration is necessary between the request from the first requesting part and the request from the second requesting part; and carry out arbitration of a generation voltage.

* * * * *